Oct. 14, 1930.   M. PARSONS   1,778,706
ELECTRICAL SUPERVISORY SYSTEM FOR AUTOMATIC CONTROL WATER GAS MACHINES
Filed Dec. 14, 1927   4 Sheets-Sheet 1

WITNESS:

Morgan Parsons
BY
Augustus B. Stoughton.
ATTORNEY.

Oct. 14, 1930.   M. PARSONS   1,778,706
ELECTRICAL SUPERVISORY SYSTEM FOR AUTOMATIC CONTROL WATER GAS MACHINES
Filed Dec. 14, 1927   4 Sheets-Sheet 4

Patented Oct. 14, 1930

1,778,706

UNITED STATES PATENT OFFICE

MORGAN PARSONS, OF MOYLAN, PENNSYLVANIA, ASSIGNOR TO THE U. G. I. CONTRACTING COMPANY, OF PHILADELPHIA, PENNSYLVANIA, A CORPORATION OF DELAWARE

ELECTRICAL SUPERVISORY SYSTEM FOR AUTOMATIC CONTROL WATER-GAS MACHINES

Application filed December 14, 1927. Serial No. 239,840.

One object of this invention is to provide an electrical system which will supervise the operation of the valves of a water gas machine when controlled by an automatic control machine so that the valves of the water gas machine will be placed in a safe shut-down position if any one valve fails to complete its operation promptly when actuated by the automatic control machine.

Other objects will appear from the following description at the end of which the invention will be claimed after having been first described in connection with the accompanying drawings forming part hereof and in which Figure 1 is a side elevation of a water gas machine.

Figure 1:
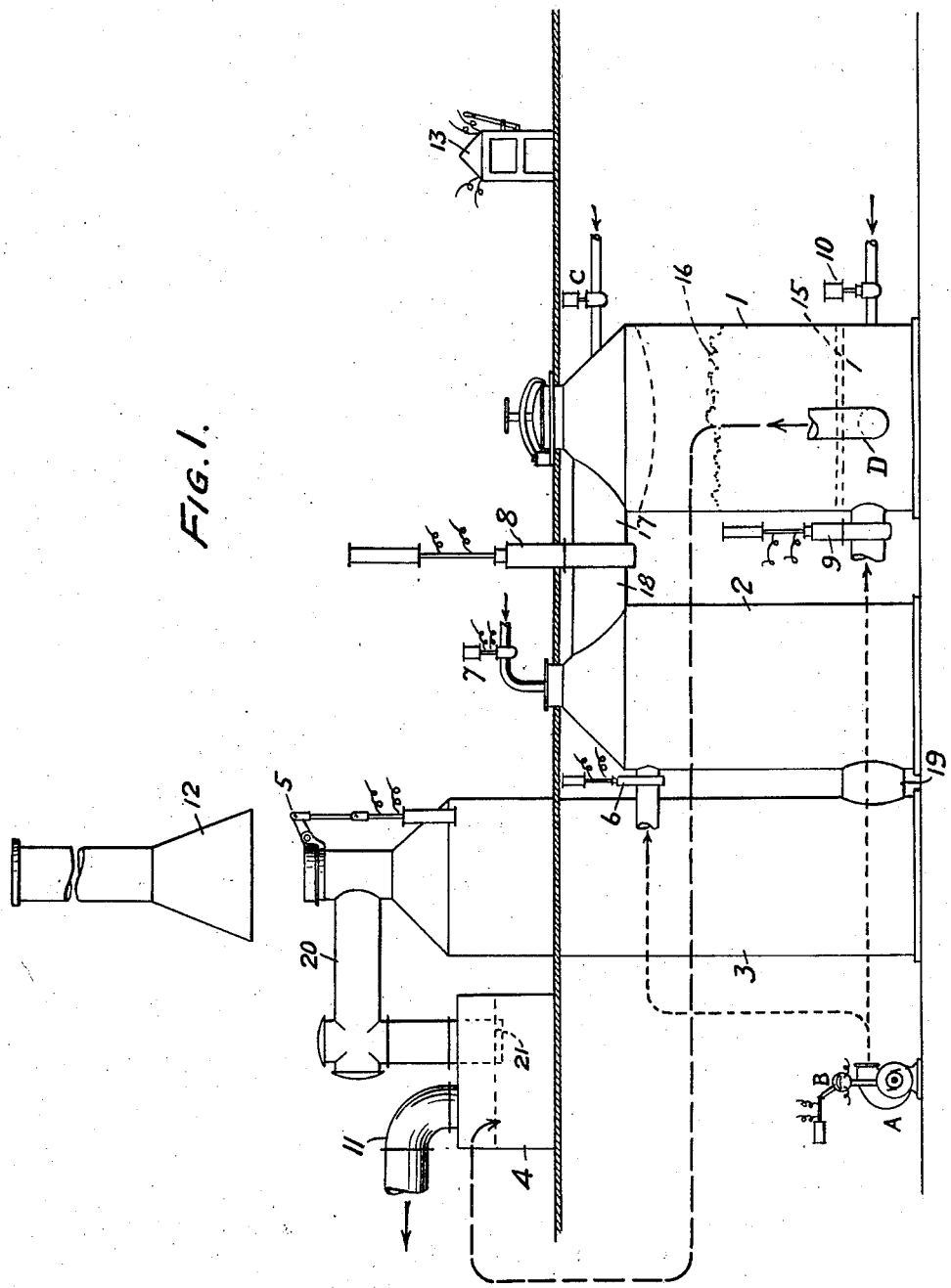

Referring to Figure 1, 1 is the generator containing the fuel bed, 2 is the carbureter, 3 the superheater, and 4 the seal box. 13 is a well known automatic control machine consisting of a nest of hydraulic valves, and mechanical means driven by an electric motor which operates the valves at predetermined intervals of time. The hydraulic valves in the nest are connected to the hydraulic operating cylinders on each of the valves on the gas machine by pipes which are not shown in Figure 1, all of which, so far as is necessary for an understanding of this invention, will be hereinafter described.

During the blowing period a primary air blast is admitted through the generator blast valve 9 into the ash pit 15, passes up through the fuel bed 16, the pipe 17, valve 8, pipe 18 and into the carbureter 2. Here a secondary air blast is admitted through the carbureter blast valve 6. The products of combustion pass from the carbureter through the connection 19 into the superheater 3, out through the stack valve 5, and up the stack 12 to the atmosphere. A is a blower for supplying air and B is its starting and stopping switch.

During the gas making period or "run" valves 9, 6 and 5 are closed and steam is admitted through valve 10 into the ash pit 15, passes up through the fuel bed 16 and forms blue gas. This gas passes through pipe 17, valve 8 and pipe 18 into the carbureter 2. Oil is admitted through valve 7 and is vaporized and mixed with the blue gas in the carbureter. The mixed or carbureted water gas then passes through the connection 19 into the superheater 3 through the pipe 20 and bubbles up through the water 21 in the seal box 4. From the seal box the gas is conducted through the pipe 11 to a "holder" where it is stored. Sometimes the valve 8 is closed, steam is admitted at C, and blue water gas is led off at D to the seal box 4.

Figure 2:
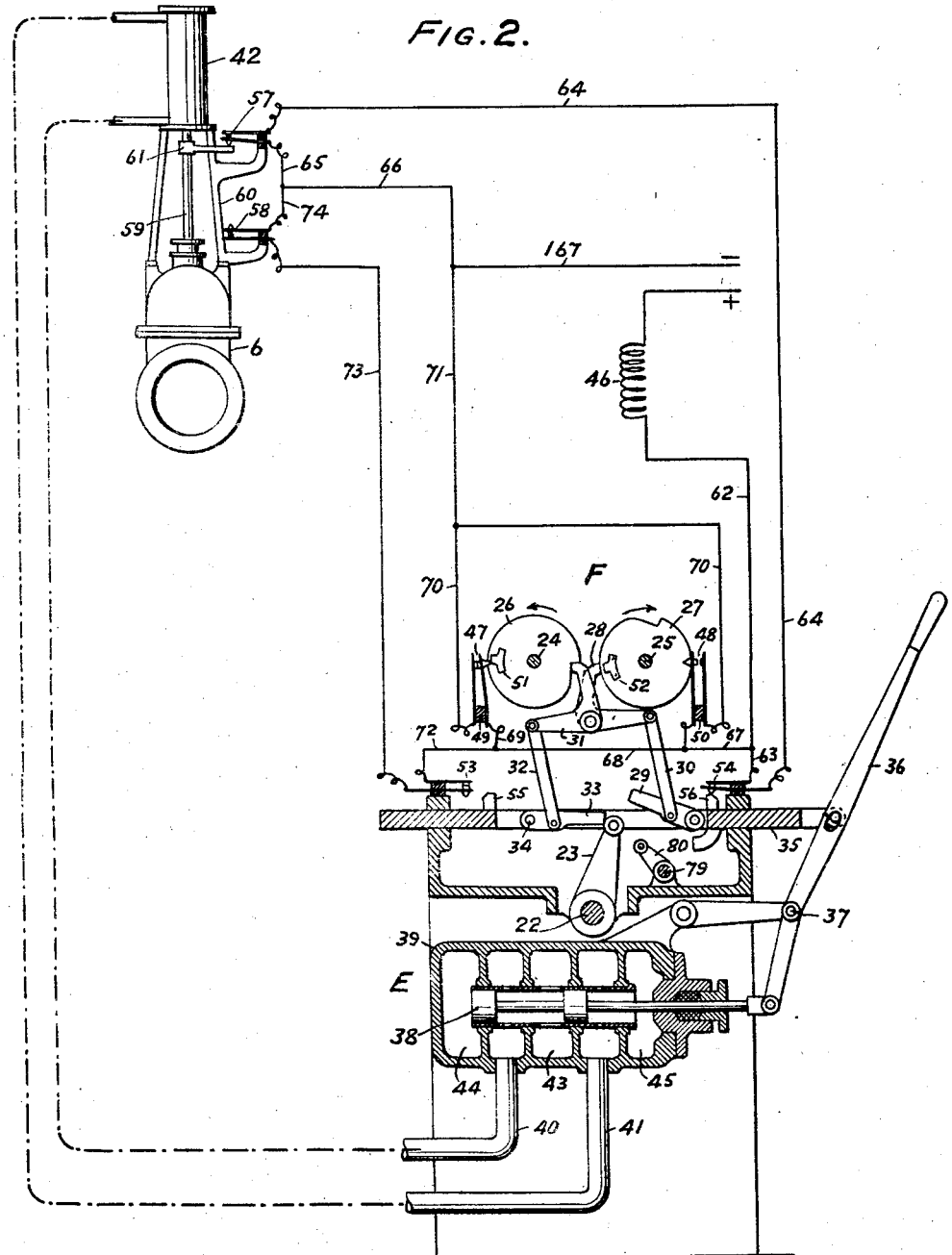
Figure 2 is a view partly in elevation and partly in section showing, as a sample, one valve on this gas machine, a mechanism for automatically operating this valve at predetermined intervals, and a system of electric wiring and switches for supervising the operation of the valve.

Referring to Figure 2, 6 represents the carbureter blast valve of the water gas machine, which is chosen as a sample of the various like elements of the set. The hydraulic master valve nest generally shown at E controls the operation of the valve 6 as well as the operation of other like elements. The automatic control machine which times the operation of the master valves is generally indicated at F. A sample of a system of electrical switches and wires which supervise the valve operation to determine whether or not it agrees with the timing of the automatic control machine is shown and will be hereinafter described in connection with a description of the operation.

From a description of the operation in connection with the sample element 6, the operation in connection with other like elements will be understood and the mode of operation in connection with the element 6 may be described as follows:

A motor (not shown) rotates the shaft 22 backward and forward through an angle of about 20 degrees. Attached to this shaft is the crank 23. The shafts 24 and 25 are also driven by the same motor through a suitable train of gears (not shown). The cams 26 and 27 are keyed to these shafts and rotate with them. Bell crank 28 is shown riding on the face of the cam 27, thus holding the pawl 29 clear of the moving crank 23 by means of the link 30. Bell crank 31 however, is shown as just having dropped into the notch in cam 26. This lowered the link 32 which in turn dropped the pawl 33 into the path of the moving crank 23. The motion of the crank is communicated through the pin 34 to the sliding bar 35 and moves it to the left. The slide bar 35 being attached to the operating lever 36 pulls its top to the left and forces its lower end to the right; it being pivoted on the pin 37. This moves the piston 38 from left to right in the master valve housing 39, reverses the pressure and discharge on pipes 40 and 41 and on the hydraulic operating cylinder 42, and closes the valve 6. 43 is the pressure port in the master valve, and 44 and 45 are discharge ports.

The electrical supervising system which is the subject of this application will next be described. The object of the system is to maintain a flow of current through the solenoid 46 when the valves of the gas machine are functioning properly and to interrupt this flow of current when a valve fails to operate, as directed by the automatic control machine, within a given time.

Switches 47 and 48 are located at the side of the cams and are supported on the rods of insulating material 49 and 50. The switches are normally open and are closed by the blocks 51 and 52 attached to the cams.

Switches 53 and 54 are mounted on insulating blocks attached to the frame of the automatic control machine. They are normally open and are closed by the blocks 55 and 56 attached to the slide bar 35.

Switches 57 and 58 are mounted on insulating blocks located at the upper and lower limits of travel of the valve stem 59, and they are supported on brackets which are attached to the A frame 60. The switches are normally open and are closed by the arm 61 attached to the valve stem 59.

Figure 4:
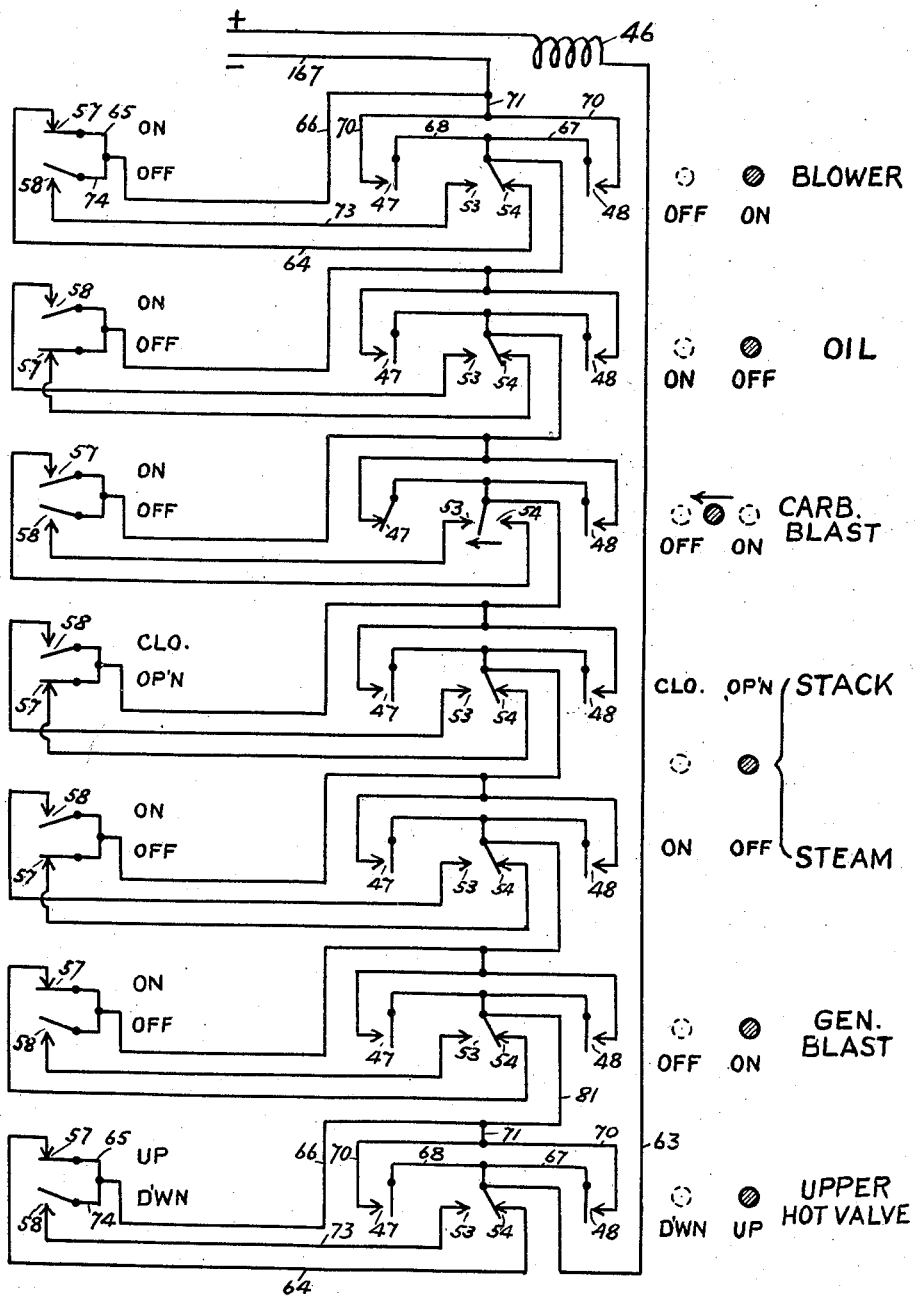
Figure 4 is a diagrammatic view showing a wiring diagram for the valves on the water gas machine.

For the purpose of describing the operation, assume that the cams 26 and 27 have not yet revolved into the position shown in Fig. 2 so that switches 47 and 48 are both open, see Fig. 4, "upper hot valve." A flow of current, is, however, maintained through the following path:—positive side of the line, solenoid 46, wires 62 and 63, switch 54, wire 64, switch 57, wires 65, 66 and 167, and returning to the negative side of the line.

As the cams 26 and 27 revolve they come into the position illustrated in Figure 2. Bell crank 31 drops into the notch in cam 26 and initiates the sequence of operations which result in the reversal of valve 6 as described above. At the same time switch 47 is closed by block 51 and a holding circuit is established through the solenoid to keep it energized during the time the slide bar 35 is moving from right to left and the valve 6 is moving from its open to its closed position, see Fig. 4," carb blast." The length of time the holding circuit is maintained is only a little longer than the normal time required for valve 6 to move from open to closed position and it is so regulated by the length of the face on block 51. The holding circuit takes the path:—positive line, solenoid 46, wires 62, 67, 68 and 69, switch 47, wires 70, 71 and 167 to negative side of line.

After the slide bar 35 has completed its travel from right to left and the valve 6 has completed its downward motion, a new circuit is established and the holding circuit through switch 47 is opened. This new circuit takes the path:—positive line, solenoid 46, wires 62, 67, 68 and 72, switch 53, wire 73, switch 58, wires 74, 66 and 167 to negative side of line.

Figure 3:
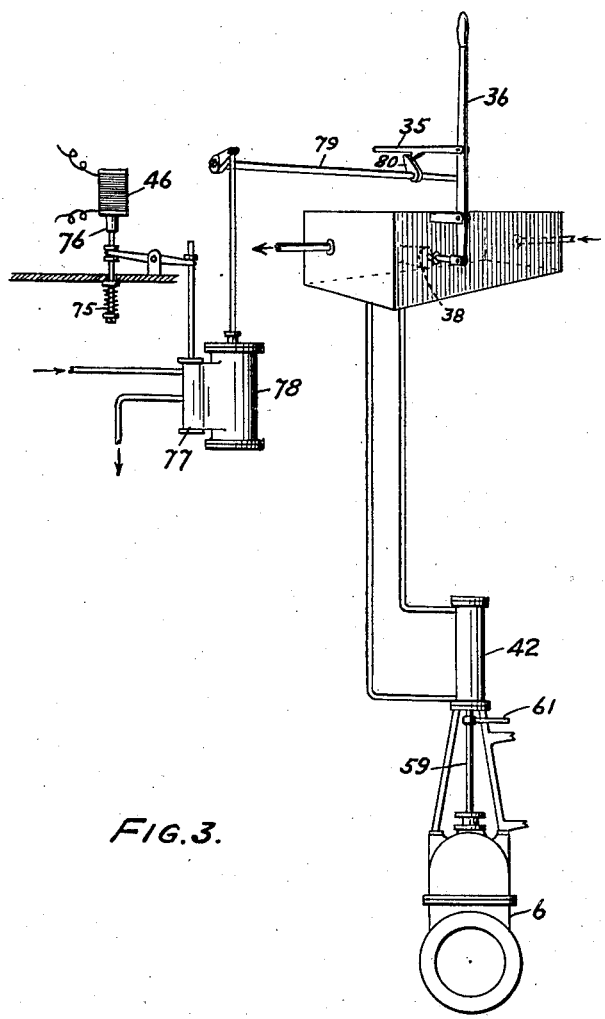
Figure 3 is a view partly in elevation showing the mechanism in the automatic control machine which operates to put the valves of the gas machine in a safe shut-down position.

However, if the valve 6 fails to complete its travel and thereby close switch 58 before the holding circuit completed through switch 47 is opened, the circuit through solenoid 46 will be opened, this electro-magnet will be de-energized, and the spring 75, Figure 3, will pull down the core 76. This operates the hydraulic valve 77 and hydraulic operating cylinder 78. This in turn rotates the shaft 79 and crank 80 to move the handle 36 and four way hydraulic valve 38 into such position that the valve 6 will be placed in a safe shut-down position by the hydraulic operating cylinder 42.

Referring to Fig. 4 there is shown a typical wiring diagram for the usual valves on a water gas machine. In that diagram the air blasting step is still continuing but the air blasting to the carbureter 2 is about to be cut off and the valve 6 is moving to cut off the carbureter blast. In that diagram the column, at the extreme right, indicates the name of the valve to which the wiring diagram set opposite the name to the left, relates, and in the intermediate column the dotted and cross-hatched circles indicate, the latter the position of the valve as indicated by the legend, and the former the position to which the valve will move as indicated by the legend. In the case of the carbureter blast valve the arrow and the cross-hatched circle indicate that the valve is moving and is in an intermediate position. The legends of the column on the left indicate the position of the switches when the elements, mentioned in the column to the right, are in the condition indicated by the intermediate column. Inasmuch as the wiring for one valve or like element is repeated for each valve the same reference numbers have been used. Of course there is but one solenoid 46. The wiring for each valve is connected in series by conductors 81, so that if any valve fails to operate correctly the solenoid will be de-energized and all the valves of the water gas set will be placed in safe shutdown positions.

By way of further description the following may be said: The power driven oscillating member 23 is an example of the power mechanism of a control apparatus. The rotating cams 26 and 27 are an example of the cam mechanism of a control apparatus. The bar 35 is an example of the valve actuator of a control apparatus. The pawls 33 and 29 are an example of connecting and disconnecting means of an automatic control apparatus. The switches 53 and 54 are transfer switches and it is their function to establish a current path to the limit switch, as 57 or 58, on the controlled element, as 6 toward which the element is to be moved and to interrupt the current path to the limit switch from which the element is to be moved.

In normal operation the transfer switches establish the described circuit path and during the movement of the element, as 6, the flow of current through them is interrupted at both of the limit switches 57 and 58, but during this interruption the holdover switches as 47 and 48 maintain the circuit through the solenoid 46 for a time a little longer than sufficient to allow of the completion of the travel of the element 6. A circuit through a transfer switch is maintained by the limit switch at the end of the travel of the element which controls the limit switch, so long as the element is at rest in that position.

Under abnormal conditions it may be assumed that the element 6 jams or sticks and does not start, the transfer switches interrupt the current path through the limit switch nearest the element and establish the current path at the limit switch furthest from the element and no current passes through the limit switches, but the holdover switches maintain the circuit through the solenoid 46 for a period of time sufficient for the element 6 to complete its travel, so that even if the element 6 starts a little late, the solenoid 46 will remain energized, but if the element 6 does not start and remains jamed the holdover switches will interrupt the circuit through the solenoid 46 and in that way cause the automatic control to put the gas making apparatus in safe shutdown position. If the element as 6 should stick in an intermediate position for the time required for its normal travel, the circuit path will be interrupted at each of the limit switches and the holdover switches 47 and 48 will operate as last above described.

It is evident that after passing through the solenoid 46 the circuit divides. In one division the holdover switches are interposed in parallel relation. The other division includes a branch and in each part thereof a transfer switch and a limit switch are arranged in series relation, so that when a limit switch through which the transfer switch has established a circuit path, is open the circuit through the solenoid is controlled by one or the other of the holdover switches, and when both the holdover switches are open the circuit is controlled through one or the other of the limit switches according as a transfer switch has established a circuit path to it.

In the appended claims the expression valves is inclusive of elements which are not strictly valves but which are operated by the automatic control apparatus.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. In apparatus of the type recited the combination of a valve, a cam mechanism and a valve actuator comprising an automatic control apparatus by which the valve is normally opened and closed, and a solenoid of the automatic control apparatus and its connections by which the valve is put into safe shutdown position, with normally open limit switches closable by the valve at the end of its travel, transfer switches responsive to the valve actuator and adapted to establish a circuit path to the limit switch toward which the valve is moving and to disestablish a circuit path to the other limit switch, holdover switches responsive to the cam mechanism, and circuit connections through the solenoid and said switches whereby the holdover switches maintain circuit through the solenoid for an interval of time when the limit switches are ineffective.

2. In apparatus of the type recited the combination of a valve, a cam mechanism and sliding bar of a power mechanism for automatically operating the valve at predetermined intervals, a solenoid inoperative on closed circuit and connections for positioning said valve in safe shutdown position, normally open limit switches closable by said valve at the limits of its travel, transfer switches responsive to the end travel of said bar for closing a circuit path at the limit switch toward which the valve is moving, and for disestablishing a circuit path to the other limit switch, holdover switches responsive to the cam mechanism and adapted to maintain circuit through the solenoid for a limited period of time during which the limit switches are ineffective, and circuit connections through the solenoid and through said switches.

3. An electrical supervising system for automatic control apparatus for valves comprising a normally energized solenoid and connections adapted upon de-energization to put the valves in safe shutdown position, normally open limit switches arranged at the end of the travel of the valves and closable thereby, transfer switches responsive to the automatic control apparatus and adapted to establish a circuit path at the limit switches toward which the valves are moving, and to disestablish a circuit path to the other limit switches, holdover switches responsive to the automatic control apparatus and adapted to maintain circuit through the solenoid for a limited interval of time when the limit switches are ineffective, and circuit connections through said solenoid and switches.

4. An electrical supervisory system for sequence operated valves comprising a solenoid mechanism inoperative on closed circuit and adapted on open circuit to actuate the valves to "safe position," normally open limit switch mechanism closable by the valves upon completion of their normal movements, transfer switch mechanism for establishing circuit paths to the limit switches towards which said valves are moving and for interrupting circuit paths to the limit switch mechanism from which the valves are moving, holdover switch mechanism operative to establish and to maintain a circuit path through the solenoid for intervals of time slightly exceeding the intervals of time required for normal movement of said valves, and circuit connections.

5. An electrical supervisory system for sequence operated valves comprising normally open limit switches arranged at the ends of travel of a valve, transfer switch mechanism for directing current to the limit switch toward which the valve is moving and away from the limit switch from which the valve is moving, holdover switch mechanism operative when the valve is traveling in the performance of normal opening and closing, electromagnetic mechanism inoperative on closed circuit and operative on open circuit to put the valve into safe shutdown position, said holdover switch mechanism operative to maintain closed circuit through the solenoid mechanism for intervals of time slightly in excess of the time required for the normal travel of the valve, and circuit connections.

MORGAN PARSONS.